United States Patent
Yajnik et al.

(10) Patent No.: US 10,848,465 B2
(45) Date of Patent: Nov. 24, 2020

(54) DYNAMIC FIREWALLS AND FORENSIC GATEWAYS

(71) Applicant: Extreme Networks, Inc., San Jose, CA (US)

(72) Inventors: Shalini Yajnik, Berkeley Heights, NJ (US); Anjur S. Krishnakumar, Princeton, NJ (US); Venkatesh Krishnaswamy, San Ramon, CA (US); Laurent Philonenko, San Francisco, CA (US)

(73) Assignee: Extreme Networks, Inc., San Jose, CA (US)

( * ) Notice: Subject to any disclaimer, the term of this patent is extended or adjusted under 35 U.S.C. 154(b) by 420 days.

(21) Appl. No.: 15/283,903

(22) Filed: Oct. 3, 2016

(65) Prior Publication Data

US 2017/0250956 A1    Aug. 31, 2017

Related U.S. Application Data

(60) Provisional application No. 62/300,616, filed on Feb. 26, 2016.

(51) Int. Cl.
*G06F 9/00* (2006.01)
*G06F 15/16* (2006.01)
*G06F 17/00* (2019.01)
*H04L 29/06* (2006.01)

(52) U.S. Cl.
CPC ...... *H04L 63/0272* (2013.01); *H04L 63/1416* (2013.01); *H04L 63/1425* (2013.01)

(58) Field of Classification Search
USPC ......................................................... 726/12
See application file for complete search history.

(56) References Cited

U.S. PATENT DOCUMENTS

| | | | |
|---|---|---|---|
| 2007/0112578 A1* | 5/2007 | Randle | H04L 63/0272 713/156 |
| 2010/0299430 A1* | 11/2010 | Powers | H04L 12/2809 709/224 |
| 2013/0212709 A1* | 8/2013 | Tucker | G06F 21/55 726/29 |
| 2014/0053226 A1* | 2/2014 | Fadida | H04L 67/34 726/1 |
| 2016/0232024 A1* | 8/2016 | Hamilton, II | G06F 9/45558 |
| 2017/0104782 A1* | 4/2017 | Folco | H04L 63/02 |

* cited by examiner

*Primary Examiner* — Wasika Nipa
*Assistant Examiner* — Samuel Ambaye
(74) *Attorney, Agent, or Firm* — Sterne, Kessler, Goldstein & Fox P.L.L.C.

(57) ABSTRACT

A security event that is associated with one or more communication devices is detected. For example, the security event may be an unexpected change in data being sent from a communication device outside an enterprise. In response to detecting the security event, a Virtual Service Network (VSN) is created that isolates one or more communication devices that may pose a security risk. A corrective action to mitigate the security event is then implemented. For example, the corrective action may be to dynamically instantiate a firewall on the VSN that blocks the transfer of data from the communication device outside the enterprise. This allows an administrator to review the security event and take further action if necessary. Because the VSN with the firewall is created dynamically, the network remains secure while the security event is investigated.

20 Claims, 6 Drawing Sheets

DYNAMIC FIREWALLS AND FORENSIC GATEWAYS

CROSS REFERENCE TO RELATED APPLICATION

The present application claims the benefits of U.S. Provisional Application Ser. No. 62/300,616, filed Feb. 26, 2016, entitled "DYNAMIC FIREWALLS AND FORENSIC GATEWAYS", which is incorporated herein by reference in its entirety.

FIELD

The disclosure relates generally to security of computer networks and in particular to isolation of security threats in computer networks.

BACKGROUND

Today's networks have various levels of security. The security measures are typically isolated to individual computers or devices. For example, if a user believes that there may be a virus on their computer, the user or an administrator may run an anti-virus software program to detect and clean the virus on that particular computer. However, this solution may take time to isolate the virus. In the mean time, the virus may have been spread on the computer network. Other solutions may be to implement a firewall to detect unwanted use of ports in a computer network. However, current solutions lack the ability to quickly identify security issues, determine the extent of the security breach, and automatically isolate the communication devices that may be causing the security breach.

SUMMARY

These and other needs are addressed by the various embodiments and configurations of the present disclosure. A security event that is associated with one or more communication devices is detected. For example, the security event may be an unexpected change in data being sent from a communication device outside an enterprise. In response to detecting the security event, a Virtual Service Network (VSN) is created that isolates one or more communication devices that may pose a security risk. A corrective action to mitigate the security event is then implemented. For example, the corrective action may be to dynamically instantiate a firewall on the VSN that blocks the transfer of data from the communication device outside the enterprise. This allows an administrator to review the security event and take further action if necessary. Because the VSN with the firewall is created dynamically, the network remains secure while the security event is investigated.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112 Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
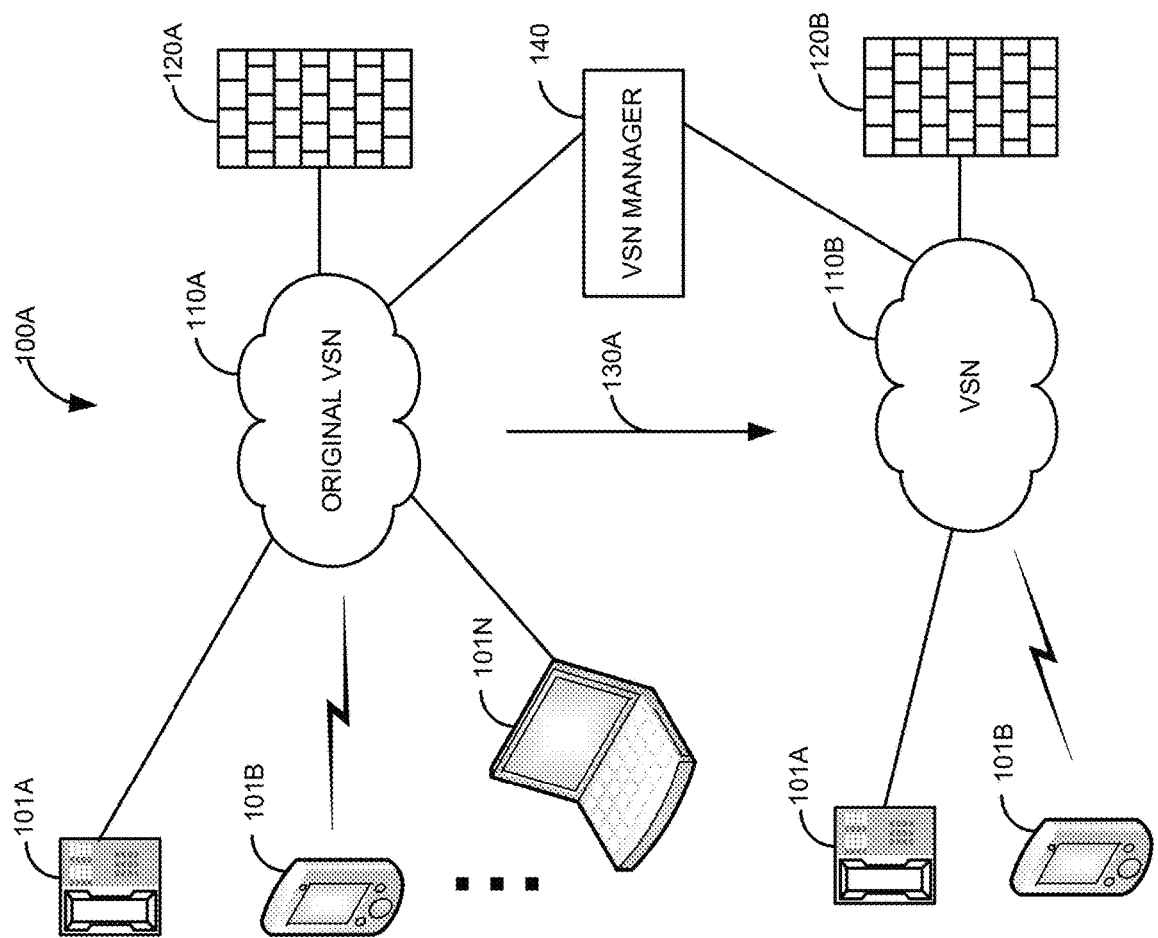
FIG. 1 is a block diagram of a first illustrative system for creating a Virtual Service Network (VSN) to isolate one or more communication devices based on a security event.

FIG. 1 is a block diagram of a first illustrative system 100 for creating a Virtual Service Network (VSN) 110B to isolate one or more communication devices 101 based on a security event 130A. The first illustrative system 100 comprises communication devices 101A-101N, VSNs 110A-110B, firewalls 120A-120B, and VSN manager 140.

The communication devices 101A-101B can be or may include any device that can communicate on the VSN 110, such as a Personal Computer (PC), a telephone, a video system, a cellular telephone, a Personal Digital Assistant (PDA), a tablet device, a notebook device, a smart phone, an Internet of Things (IoT) device, and/or the like. As shown in FIG. 1, any number of communication devices 101A-101N may be connected to the original VSN 110A. The communication devices 101A-101N are shown in FIG. 1 as communication endpoints. However, the communication devices 101 may comprise network elements, such as a server, a file server, a router, a Private Branch Exchange (PBX), a conference bridge, a central office switch, a proxy server, a video switch, and/or the like. The VSNs 110A-110B may be any network that is created virtually. A VSN is better understood in the context of IEEE 802.1aq https://en.wikipedia.org/wiki/IEEE_802.1aq, which is incorporated herein by reference. However the VSN could also be created in a traditional VLAN environment, although the implementation would be generally more difficult and complex.

With the advent of virtual computing, a computer network/communication devices 101 may be virtualized on a cloud computing system. For example, the communication devices 101A-101N may be running a thin client that connects to a virtualization system that virtualizes the communication devices 101A-101N and network elements to run on one or more virtual platforms. Each communication device 101A-101N may run as a virtual thread in the cloud computing system. In this example, the inter connection/communication of the communication devices 101A-101N is accomplished virtually. In addition, the VSNs 110A-110B may comprise other virtual elements, such as a Private Branch Exchange (PBX), a router, a proxy server, a session manager, a communication manager, an applications server, a file server, a video switch, a conference bridge, and/or the like that are created as a part of the VSNs 110A-110B. In some embodiments, a VSN 110 may comprise virtual elements and non-virtual elements.

The firewalls 120A-120B can be or may include any hardware coupled with software to provide protection services to a network, such as a Network Address Translator (NAT), a Session Border Controller (SBC), a virus scanner, and/or the like. In FIG. 1, the firewalls 120A-120B are typically connected to an unsecure network, such as the Internet. The firewalls 120A-120B protect the VSNs 110A-110B from security threats. In the firewall 120B may be used to isolate a security threat on the VSN 110B.

The VSN manager 140 can be or may include any hardware coupled with software that can create and manage a VSN 110. The VSN manager 140 can create different processes for other services, such as the firewalls 120A-120B, a forensic gateway (see FIG. 2, element 230), or other security services. The VSN manager 140 may run across a plurality of processor cores/servers to generate the VSNs 110A-110B.

FIG. 1 shows an original VSN 110A that comprises the communication devices 101A-101N and the firewall 120A. A security event 130A is detected by the VSN manager 140. The security event 130A can be based on a variety of types of events. The security event 130A may comprise multiple security events 130. For example the security event 130A may be a user attempting to access a defined Uniform Resource Locator (URL) (e.g., a blacklisted URL). The security event may be performed on another device or system on the network. In this example, the security event is sent to VSN manager 140. Alternatively, the VSN manager 140 may poll a system or device on the network to capture a security event. Certain URLs may have been defined by an administrator or security software that may cause security breaches. When one of these URLs are accessed by a user, a security event 130 may be generated. Likewise, the security event 130A may be based on an access of an Internet Protocol (IP) address, a phone number, or a global user identifier. Alternatively, the security event 130 may be an attempt of an application to use a defined port. For example, computer malware may try to establish a communication session using a IP port on the firewall 120A that may be blocked. This can result in the security event 130A. The security event 130A may be based an unexpected amount of traffic. For example, malware may start to copy large portions of a computer's hard disk, which results in the security event 130A. Likewise, the security event 130 may be a pattern in network traffic. For example, a volume of network traffic that above or below a threshold may generate the security event 130A. The security event 130A may be based a large amount of telephone calls or a denial of service attack. The security event 130A may be based on the initiation of an unexpected communication session. For example, if a communication device 101 is trying to make a video call when the communication device 101 does not support video calls. Alternatively, the security event 130A may be an unexpected type of network traffic. For example, a large volume of voice calls during non-peak hours may result in the generation of the security event 130A.

Based on the security event 130A the VSN manager 140 creates the VSN 110B to isolate the communication devices 101A-101B from the original VSN 110A. In this example, a virtual firewall 120B is created. In FIG. 1, the VSN 110B is not connected to the original VSN 110A. However, in other embodiments, the firewall 120B may be between the original VSN 110A and the VSN 110B. When the VSN 110B is created, the communication endpoints 101A-101B (those that may have a potential security problem) are removed (isolated) from the original VSN 110A and moved to the VSN 110B.

Figure 2:
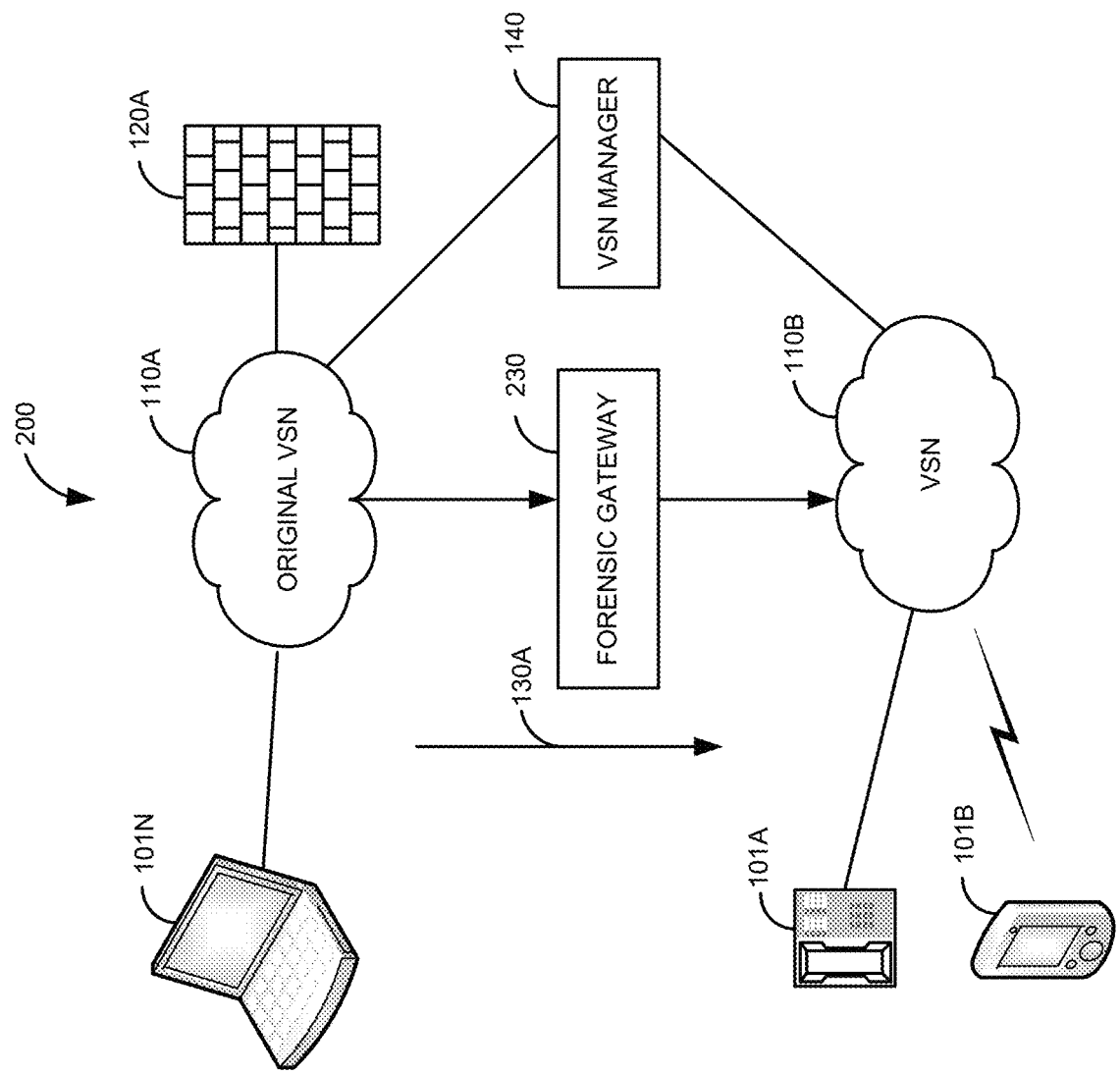
FIG. 2 is a block diagram of a second illustrative system for creating a VSN to isolate one or more communication devices based on a security event.

FIG. 2 is a block diagram of a second illustrative system 200 for creating a VSN 110B to isolate one or more communication devices 101A-101B based on a security event 130A. FIG. 2 comprises communication devices 101A-101N, VSNs 110A-110B, firewall 120A, a forensic gateway 230, and the VSN manager 140.

The forensic gateway 230 is a security device that is used to monitor communication sessions/signaling channels between the original VSN 110A and the VSN 110B. The forensic gateway 230 can monitor communication sessions/signaling channels for security breaches. The forensic gateway 230 can monitor a media stream (and/or a signaling channel) of a communication session to see if the media stream matches the type of media stream. For example, if the media stream is suppose to be voice data, but the media stream appears to be data being uploaded from a communication endpoint 101, the forensic gateway 230 may block the media stream or report the inconsistency to an administrator. The forensic gateway 230 may monitor the communication session/signaling channel for patterns, such as virus patterns, adware, or malware. The forensic gateway 230 may be used to further classify the security event 130 based on monitoring a communication session. For example, the security event 130 may be that an unusually high amount of traffic is being sent by the communication devices 101A-101B and the forensic gateway 230 can then monitor the data to determine if there is actually a security breach or not.

In this example, when the VSN 110B is created based on the security event 130A, the forensic gateway 230 is also created (e.g., a virtual forensic gateway 230) by the VSN manager 140. The forensic gateway 230 is inserted between the original VSN 110A and the VSN 110B. The forensic gateway 230 can then monitor communications between the original VSN 110A and the VSN 110B to further resolve any security issues.

Figure 3:
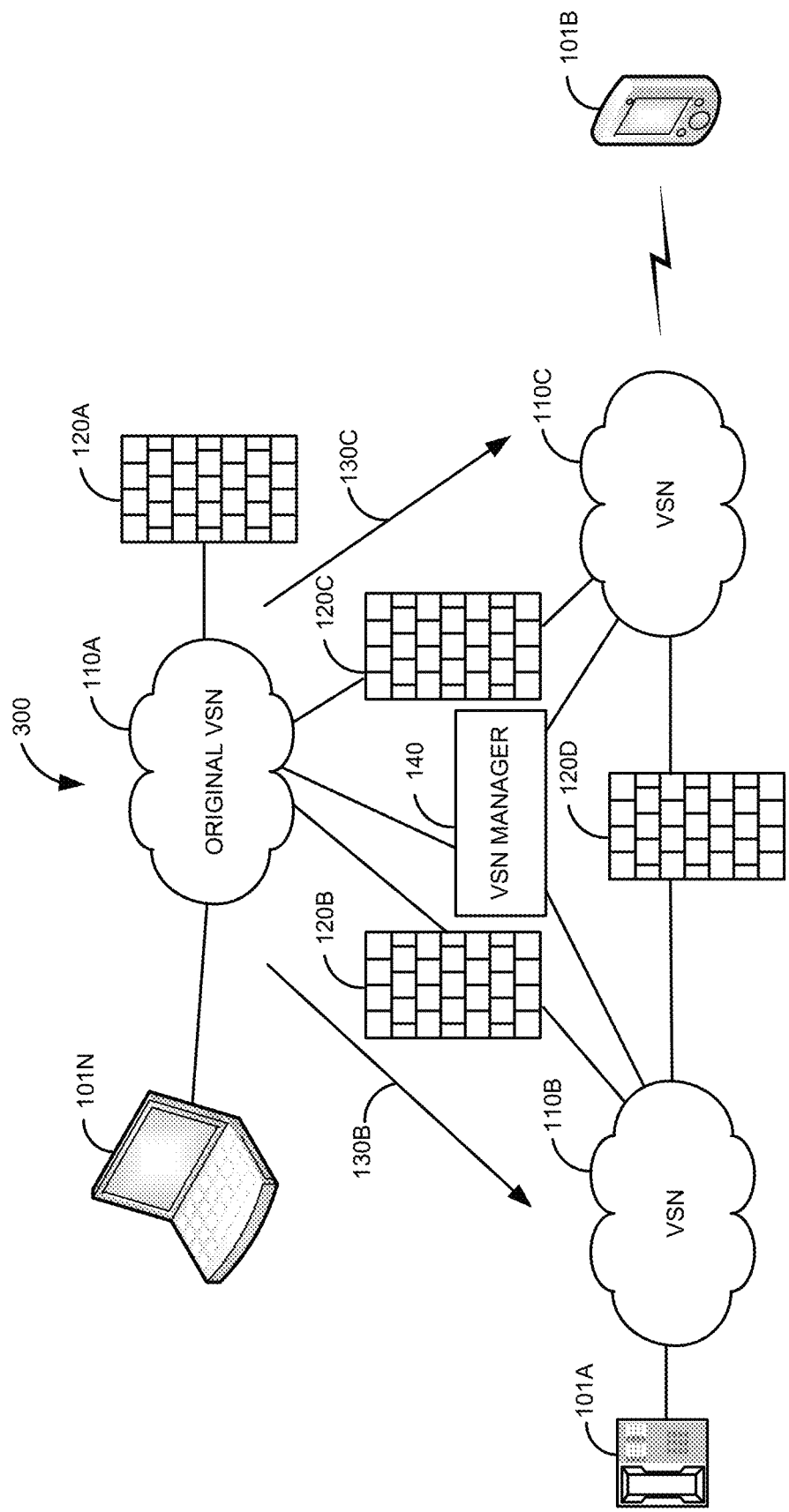
FIG. 3 is a block diagram of a third illustrative system for creating a plurality of VSNs to isolate communication devices based a plurality of security events.

FIG. 3 is a block diagram of a third illustrative system 300 for creating a plurality of VSNs 110B-110C to isolate communication devices 101A-101B based a plurality of security events 130B-130C. The third illustrative system 300 comprises the communication devices 101A-101N, VSNs 110A-110C, firewalls 120A-120D, and the VSN manager 140.

FIG. 3 started out where the original VSN 110A comprised the communication devices 101A-101N as shown in FIG. 1. In FIG. 3, two different VSNs 110B and 110C are created based on the security events 130B-130C respectively. In addition, when the VSNs 110B-110C are crated, the firewalls 120B-120D are created by the VSN manager 140. The firewalls 120B and 120D allow the VSN 110B to communicate with the original VSN 110A and the VSN 110C. The firewalls 120C and 120D allow the VSN 110C to communicate with the original VSN 110A and the VSN 110B. The firewalls 120B-120D function to provide protection services between the VSNs 110A-110C while the security events 130B and 130C are mitigated. Although not shown, the forensic gateway 230 may be used instead of or in parallel with the firewalls 120B-120D.

Figure 4:
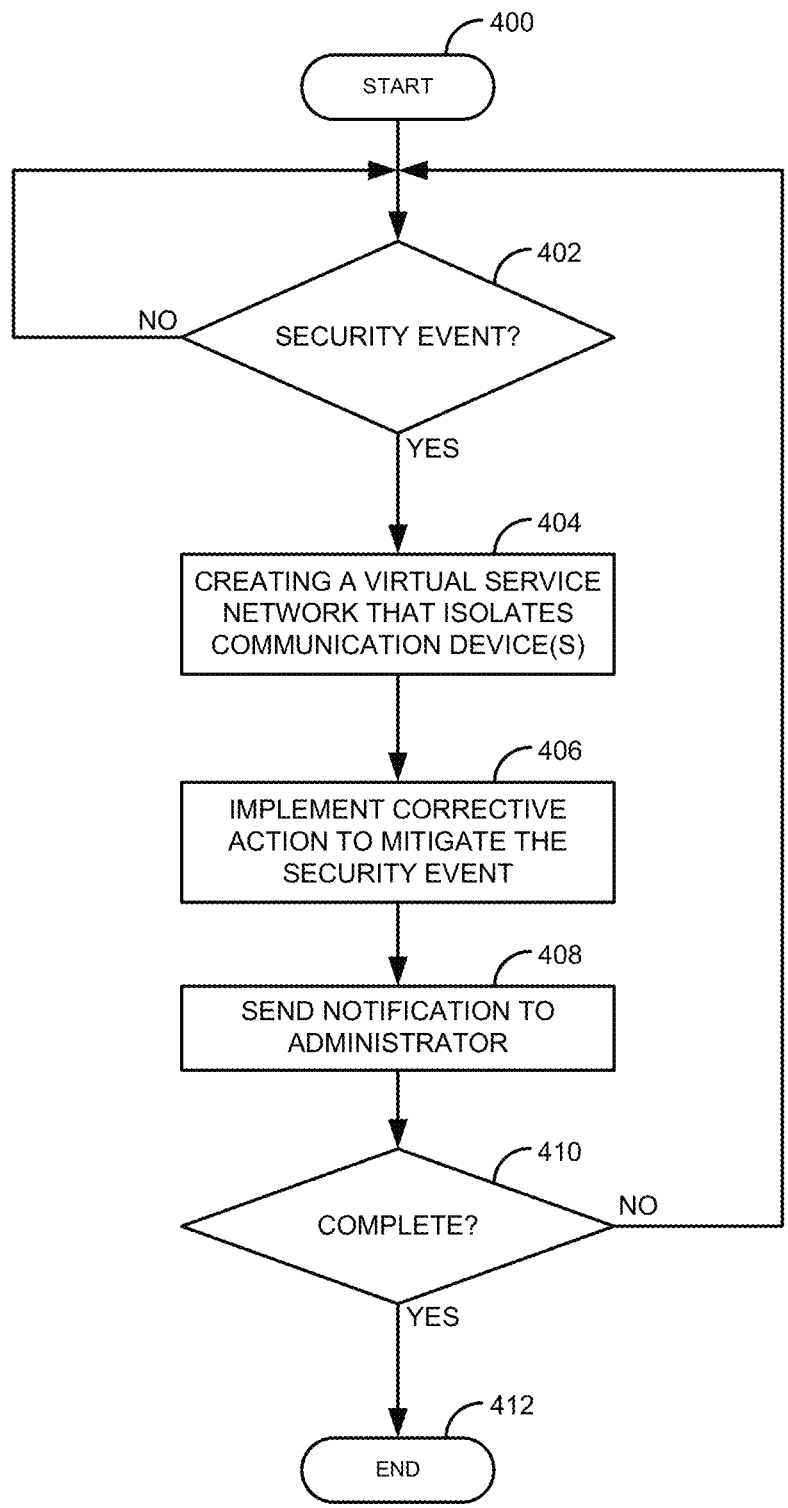
FIG. 4 is a flow diagram of a process for creating a VSN to isolate one or more communication devices based on a security event.
Figure 5:
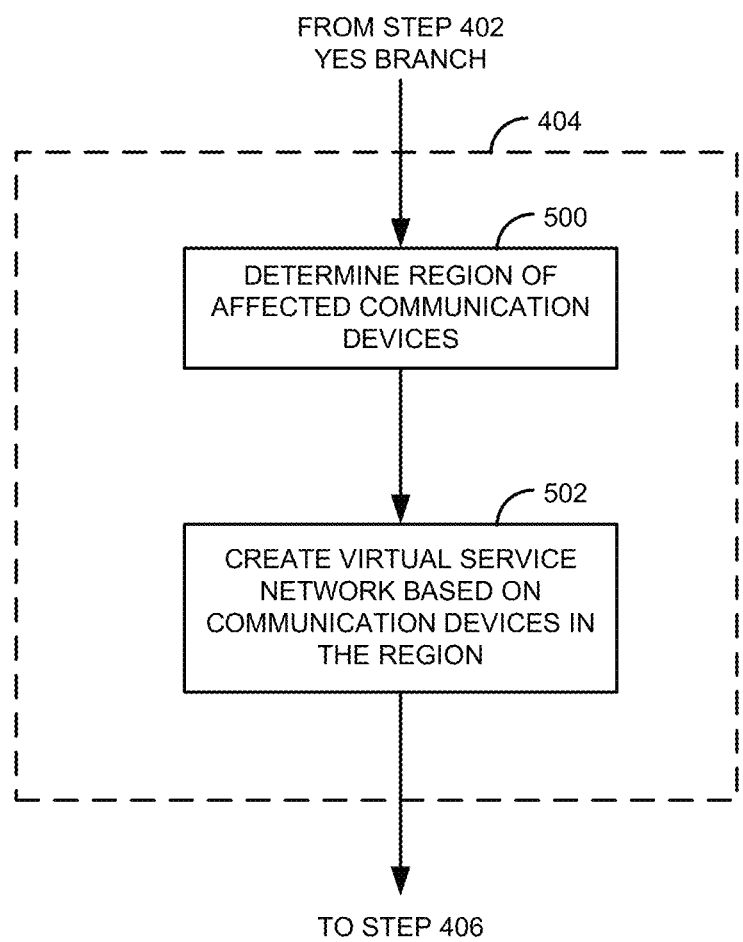
FIG. 5 is a flow diagram of a process for determining a region for a VSN.
Figure 6:
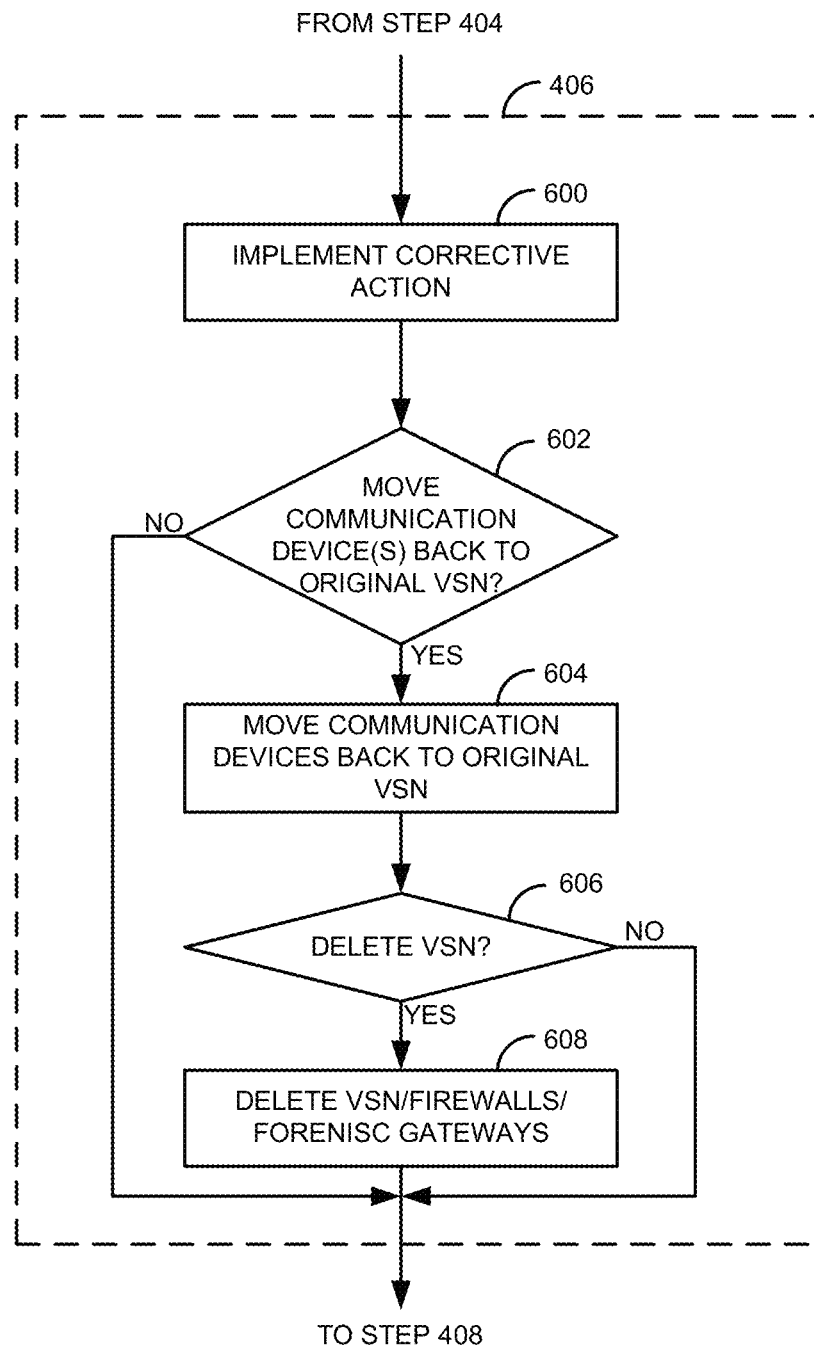
FIG. 6 is a flow diagram of a process for managing VSNs based on implementation of corrective action.

FIG. 4 is a flow diagram of a process for creating a VSN 110B to isolate one or more communication devices 101B-101N based on a security event 130. Illustratively, the communication devices 101A-101N, the VSNs 110A-110C, the firewalls 120A-120D, the forensic gateway 230, and the VSN manager 140 are stored-program-controlled entities, such as a computer or microprocessor, which performs the method of FIGS. 4-6 and the processes described herein by executing program instructions stored in a computer readable storage medium, such as a memory or disk. Although the methods described in FIGS. 4-6 are shown in a specific order, one of skill in the art would recognize that the steps in FIGS. 4-6 may be implemented in different orders and/or be implemented in a multi-threaded environment. Moreover, various steps may be omitted or added based on implementation.

The process of FIG. 4 will be explained based on FIG. 1. However, the process of FIG. 4 may also be used (e.g., as a thread) to create multiple VSNs 110 based on multiple security events 130 (e.g., as described in FIG. 3). The process starts in step 400. When step 400 begins, the original VSN 110A (that includes the communication devices 101A-101N) has already been created by the VSN manager 140.

The VSN manager 140 determines, in step 402, if a security event 130 has been detected that is associated with one or more of the communication devices 101A-101N. If a security event 130 has not been detected in step 402, the process of step 402 repeats. Otherwise, if a security event 130 is detected in step 402, the VSN manager 140 creates a VSN 110 that isolates the communication device(s) 101 in step 404. In FIG. 1, the VSN manager 140 isolates the communication devices 101A-101B in the VSN 110B based on the security event 130A. The number of communication devices 101 that are isolated may be any number of communication devices 101. The communication device(s) 101 that are isolated may be communication endpoints. In addition, the communication devices 101 may be other virtual devices/applications, such as, servers, PBXs, routers, application servers, a Back-to-Back User Agents (B2BUAs), and/or the like. When the communication devices 101A-101B are isolated, the communication devices 101A-101B are removed from the original VSN 110A and added to the newly created VSN 110B. For example, the communication devices 101 may be a communication endpoint and a application server that are removed from the original VSN and added to the VSN 110B.

The VSN manager 140, in step 406, implements one or more corrective actions to mitigate the security event 130. A corrective action may vary based on the security event 130. For example, the corrective action may be to perform a virus scan on the one or more communication devices 101. The corrective action may be to disable a port on a firewall 120. For example, if the security event 130 was an attempt to use an unassigned port on the firewall 120A, the corrective action may be to disable the port or to monitor the communication session with the forensic gateway 230. The corrective action may be to remove software from the one or more communication devices 101. For example, the corrective action may be to remove a virus or malware from one or more of the communication endpoints 101. The corrective action may be to send traffic (e.g., a media stream) to a designated device (e.g., that is a different from originally intended). The corrective action may be to block traffic to or from a communication device 101. For example, the action may be to block traffic from the communication device 101B until a virus scanner can be run on the communication device 101B. The corrective action may be to determine a group associated with a user and then scan communication devices 101 associated with the group (e.g., to detect viruses that may have been spread between different communication devices 101 of the group).

The VSN manager 140 may optionally send a notification to an administrator that indicates the detection of the security event 130 and/or a corrective action taken in step 408. Alternatively, the VSN manager 140 may log the security event 130 and/or the corrective action in a log file during step 408. The VSN manager 140 determines in step 410 if the process is complete. If the process is complete in step 410, the process ends in step 412. Otherwise, if the process is not complete in step 410, the process goes to step 402 to wait for another security event 130.

To better illustrate the process of FIG. 4, consider the following example. Assume that the original VSN 110A comprises the communication devices 101A-101N. Assume that the communication device 101A is a file server and the communication device 101B is a communication endpoint (e.g., a personal computer). The VSN manager 140 detects an unusually high amount of data being copied from the file server (101A) to the communication endpoint (101B) (the security event 130 of step 402). As a result of the security event 130, the VSN manager 140 creates the VSN 110B and moves the communication devices 101A-101B into the VSN 110B in step 404. The VSN manager 140 instantiates and inserts the forensic gateway 230 into the communication session between the communication devices 101A and 101B, in step 406. The forensic gateway 230 then monitors the communication session between the communication devices 101A-101B to better determine what type of data is being copied. The VSN manager 140 sends a message to the administrator, in step 408, to investigate the potential security breach where a large amount of files are being copied from the file server (101A) to the communication endpoint 101B.

FIG. 5 is a flow diagram of a process for determining a region for a VSN 110. The process of FIG. 5 is an exemplary embodiment of step 404 of FIG. 4.

After detecting the security event 130, in step 402, the VSN manager 140 determines, in step 500, a region of affected communication devices 101. A region of affected communication devices 101 is a number of communication devices 101 that may have compromised security. The number of communication devices 101 that may have compromised security is typically based on the type of security event 130 and rules associated with the security event 130.

For example, a virus or malware may spread from one communication device 101 to another communication device 101. In this case, the region may determined based on a email list or a group users that may have received the virus or malware (e.g., within a specific time period).

Alternatively, the region may be determined based on sub-net of network address or a range of addresses. For example, if one communication device 101 is affected with a specific type of malware, all the communication devices 101 on the sub-net may be determined to be in the range of affected communication devices 101.

The region may be limited to a single communication device 101. For example, a non-telephone communication device 101N may be attempting to make a voice call via the firewall 120A (the security event 130A). In this example, the region would be limited to communication device 101N.

The region may be determined based on a communication between two (or more) communication devices 101. For example, if an unusually high amount of data is transferred between the communication devices 101B and 101N during off hours (the security event 130A), the region will be the communication devices 101B-101N. The region may be based on a group of communication devices 101 sending data. For example, in a denial of service attack, compromised communication devices 101 may send random data to deny service, such as web or voice services. In this example, the compromised communication devices 101 are identified in the region of affected communication devices 101.

The VSN manager 140 creates the VSN 110 based on the communication devices 101 in the region in step 502. For example, if the region is determined to comprise communication devices 101A-101B, the VSN manager 140 will remove the communication devices 101A-101B from the original VSN 110A and create the VSN 110B with the communication devices 101A-101B isolated from the original VSN 110A. The process then goes to step 406 where a corrective action is implemented to mitigate the security event 130.

FIG. 6 is a flow diagram of a process for managing VSNs 110 based on implementation of a corrective action. FIG. 6 is an exemplary embodiment of step 406 of FIG. 4. After creating the VSN 110 that isolates the communication devices 101 in step 404, the VSN manager 140 implements the corrective action in step 600 (e.g., as described above for step 406). The VSN manager 140 determines in step 602 if it is okay to move the communication devices 101 from the region back to the original VSN 110A. Whether a communication device 101 can be moved back to the original VSN 110A depends on the type of corrective action that was implemented in step 600. For example, if the security event 130A was a possible virus on the communication device 101B and the corrective action was to run a virus scan on the communication device 101B, the VSN manager 140 will determine, in step 602, that the communication device 101B can be moved back to the original VSN 110A if the virus scan was successful. Alternatively, if the corrective action was to notify an administrator of the security event 130, the VSN manager 140 may determine, in step 602, not to move the communication devices 101 back to the original VSN 110A and leave moving the communication devices 101 back to the original VSN 110A to the administrator.

If the VSN manager 140 determines, in step 602, not to move the communication device(s) 101 back to the original VSN 110A, the process goes to step 408. Otherwise, if the VSN manager 140 determines, in step 602, to move the communication devices 101 back to the original VSN 110A, the VSN manager 140 moves the communication devices 101 back to the original VSN 110A in step 604. In some instances, the VSN manager 140 may only move a subset of the communication devices 101 in the region back to the original VSN 110A. For example, if the corrective action was to perform a virus scan on the communication devices 101A-101B and a virus was found on the communication device 101A (but not removed), the VSN manager 140 may only move the communication device 101B back to the original VSN 110A in step 604.

The VSN manager 140 determines in step 606 whether to delete the VSN (e.g., VSN 110B or 110C). The VSN manager 140 will determine, in step 606 if the VSN 110 needs to be deleted if all the communication devices 101 in the region have been moved back to the original VSN 110A. If all the communication devices 101 in the region have been moved back to the original VSN 110A, in step 606, the VSN manager 140 deletes the VSN (110B or 110C) in step 608. The VSN manager may also delete any instances of the firewall 120/forensic gateways 230 as necessary. The process then goes to step 408. Otherwise, if the VSN manager 140 determines that all the communication devices 101 in the region have not been moved back to the original VSN 110A in step 606, the process goes to step 408. The process of steps 602-608 may run as a separate thread that may move the communication devices 101 back to the original VSN 110A and/or remove the VSN 110 at a later point in time when the security event is mitigated.

The above processes described in FIGS. 4-6 can be used to create/delete multiple VSNs (110B-110C) based on multiple security events 130B-130C as shown in FIG. 3. For example, assume the security event 130B is an attempt to make an unauthorized telephone call and the communication event 130C is a potential virus on the communication device 101B. In this example, the VSN 110B is created using the process of FIGS. 4-5 where the communication device 101A is isolated on the VSN 110B. The corrective action to mitigate the security event 130B is to instantiate firewall 120B between the VSN 110B and the original VSN 110A. The firewall 110B blocks ports for telephone calls. In addition, an administrator is notified of the security event 130B.

When the security event 130C (potential virus) occurs, the VSN manager 140 creates the VSN 110C and moves the communication device 101B to the VSN 110C. In addition, instances of the firewalls 120C and 120D may created and inserted between the VSNs 110B and 110A. The firewalls 120C and 120D block a specific type of data transfer that is caused by the potential virus between the VSNs 110C-110B and 110C-110A.

If both the security events 130B-130C are properly mitigated (as described in FIG. 6), the communication devices 101A-101B are moved back to the original VSN 110A and the VSNs 110B-110C are deleted. In addition, the instances of the firewalls 120B-120D are also deleted. This allows for the dynamic creation/removal of VSNs 110 based on security events 130 and the mitigation of security events 130.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM1926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system, comprising:
   a memory; and
   at least one processor coupled to the memory and configured to:
   detect a security event associated with one or more communication devices in a first virtual service network (VSN);
   automatically create a second VSN in response to detecting the security event;
   insert a forensic gateway between the first VSN and the second VSN in response to creating the second VSN;
   move the one or more communication devices from the first VSN to the second VSN in response to detecting the security event, wherein the second VSN isolates the one or more communication devices from the first VSN;
   implement a corrective action that mitigates the security event; and
   in response to implementing the corrective action that mitigates the security event:
   move the one or more communication devices back to the first VSN; and
   remove the second VSN that isolates the one or more communication devices from the first VSN.

2. The system of claim 1, wherein the at least one processor is further configured to:
   determine a region of communication devices affected by the security event.

3. The system of claim 2, wherein to determine the region of communication devices affected by the security event, the at least one processor is configured to:
   determine the region of communication devices affected by the security event based on one of: a sub-net of a network address, a group of a user, a range of addresses, a list of Uniform Resource Locators (URLs), or other communication devices that have communicated with the one or more communication devices within a time period.

4. The system of claim 2, wherein to create the second VSN, the at least one processor further is configured to:
   create the second VSN based at least in part on the determined region of communication devices affected by the security event.

5. The system of claim 1, wherein the security event is one of: an access of a defined Uniform Resource Locator (URL), an access of an Internet Protocol (IP) address, an attempt to use a defined port, a change in amount of traffic, a pattern in network traffic, an amount of telephone calls greater than a threshold value, an unexpected communication session, an unexpected type of network traffic, or a denial of service attack.

6. The system of claim 1, wherein the corrective action is one of: performing a virus scan on the one or more communication devices, disabling a port on a firewall, removing software from the one or more communication devices, sending traffic to a designated device, blocking traffic to a communication device, blocking traffic from a communication device, or determining a group associated with a user and scanning communication devices associated with the group.

7. The system of claim 1, wherein the forensic gateway determines a classification of the security event based at least in part on a communication session between the first VSN and the second VSN.

8. A method, comprising:
   detecting, by at least one processor, a security event associated with one or more communication devices in a first virtual service network (VSN);
   automatically creating, by the at least one processor, a second VSN in response to detecting the security event;
   inserting, by the at least one processor, a forensic gateway between the first VSN and the second VSN in response to creating the second VSN;
   moving, by the at least one processor, the one or more communication devices from the first VSN to the second VSN in response to detecting the security event;
   implementing, by the at least one processor, a corrective action that mitigates the security event; and
   in response to implementing the corrective action that mitigates the security event:
      moving, by the at least one processor, the one or more communication devices back to the first VSN; and
      removing, by the at least one processor, the second VSN that isolates the one or more communication devices from the first VSN.

9. The method of claim 8, further comprising:
   determining, by the at least one processor, a region of communication devices affected by the security event.

10. The method of claim 9, wherein the creating the second VSN comprises:
   creating the second VSN based at least in part on the determined region of communication devices affected by the security event.

11. The method of claim 9, wherein the determining further comprises:
   determining, by the at least one processor, the region of communication devices affected by the security event based on one of: a sub-net of a network address, a group of a user, a range of addresses, a list of Uniform Resource Locators (URLs), or other communication devices that have communicated with the one or more communication devices within a time period.

12. The method of claim 8, wherein the security event is one of: an access of a defined Uniform Resource Locator (URL), an access of an Internet Protocol (IP) address, an attempt to use a defined port, a change in amount of traffic, a pattern in network traffic, an amount of telephone calls greater than a threshold value, an unexpected communication session, an unexpected type of network traffic, or a denial of service attack.

13. The method of claim 8, wherein the corrective action is one of: performing a virus scan on the one or more communication devices, disabling a port on a firewall, removing software from the one or more communication devices, sending traffic to a designated device, blocking traffic to a communication device, blocking traffic from a communication device, or determining a group associated with a user and scanning communication devices associated with the group.

14. The method of claim 8, wherein the forensic gateway determines a classification of the security event based at least in part on a communication session between the first VSN and the second VSN.

15. A non-transitory computer-readable device having instructions stored thereon that, when executed by at least one computing device, causes the at least one computing device to perform operations comprising:
   detecting a security event associated with one or more communication devices in a first virtual service network (VSN);
   automatically creating a second VSN in response to detecting the security event;
   inserting a forensic gateway between the first VSN and the second VSN in response to creating the second VSN;
   moving the one or more communication devices from the first VSN to the second VSN in response to detecting the security event, wherein the second VSN isolates the one or more communication devices from the first VSN;
   implementing a corrective action that mitigates the security event; and
   in response to implementing the corrective action that mitigates the security event:
      moving the one or more communication devices back to the first VSN; and
      removing the second VSN that isolates the one or more communication devices from the first VSN.

16. The non-transitory computer-readable device of claim 15, wherein the operations further comprise:
   determining a region of communication devices affected by the security event based on one of: a sub-net of a network address, a group of a user, a range of addresses, a list of Uniform Resource Locators (URLs), or other communication devices that have communicated with the one or more communication devices within a time period.

17. The non-transitory computer-readable device of claim 16, wherein the creating the second VSN comprises:
   creating the second VSN based at least in part on the determined region of communication devices affected by the security event.

18. The non-transitory computer-readable device of claim 15, wherein the security event is one of: an access of a defined Uniform Resource Locator (URL), an access of an Internet Protocol (IP) address, an attempt to use a defined port, a change in amount of traffic, a pattern in network traffic, an amount of telephone calls greater than a threshold value, an unexpected communication session, an unexpected type of network traffic, or a denial of service attack.

19. The non-transitory computer-readable device of claim 15, wherein the corrective action is one of: performing a virus scan on the one or more communication devices, disabling a port on a firewall, removing software from the one or more communication devices, sending traffic to a designated device, blocking traffic to a communication device, blocking traffic from a communication device, or determining a group associated with a user and scanning communication devices associated with the group.

20. The non-transitory computer-readable device of claim 15, wherein the forensic gateway determines a classification of the security event based at least in part on a communication session between the first VSN and the second VSN.

* * * * *